July 3, 1962 R. S. KOFFORD 3,042,070
PRESSURE BREAK FOR POULTRY WATERING EQUIPMENT
Filed May 9, 1960
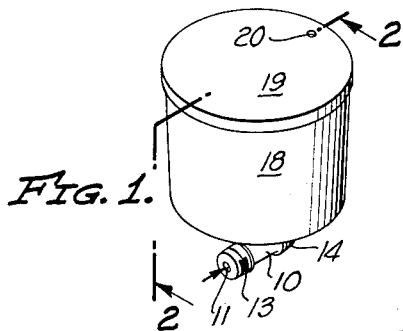
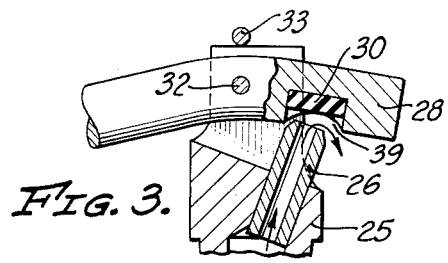
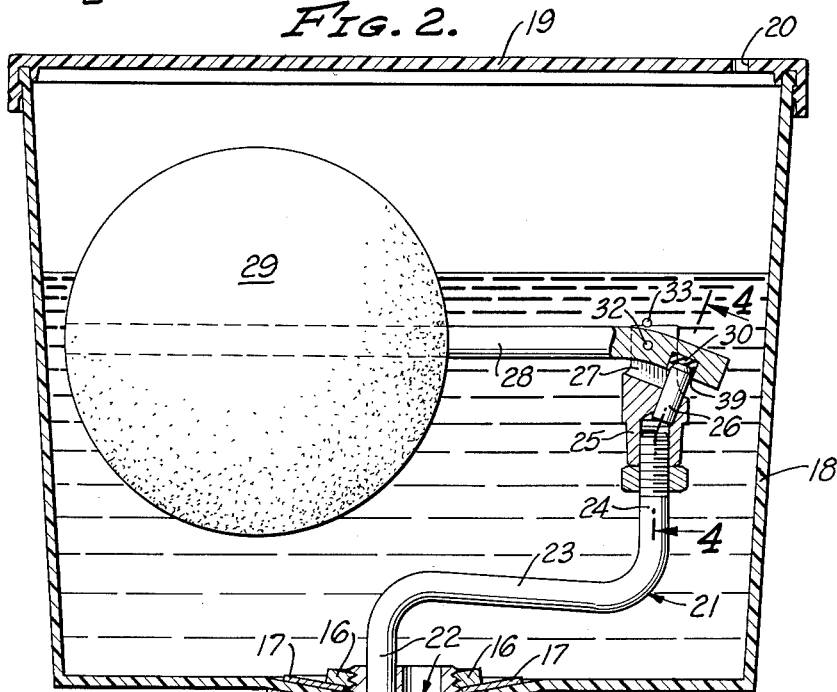
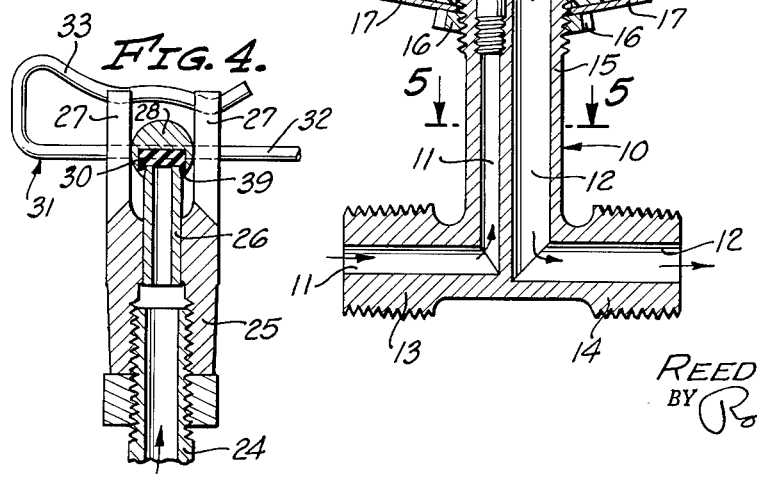
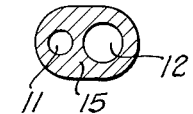
INVENTOR.
REED S. KOFFORD
BY Robert C. Comstock
ATTORNEY

United States Patent Office 3,042,070
Patented July 3, 1962

3,042,070
PRESSURE BREAK FOR POULTRY
WATERING EQUIPMENT
Reed S. Kofford, P.O. Box 453, Van Nuys, Calif.
Filed May 9, 1960, Ser. No. 27,569
5 Claims. (Cl. 137—448)

This invention relates to a pressure break or reducer for poultry watering equipment. When poultry watering devices such as peck-type valves or self-filling watering cups are installed, it is necessary to "break" or reduce the water pressure so that only a small amount of pressure is present in the line which supplies these watering devices.

It is an object of my invention to provide a new and improved pressure break and particularly one which is simpler and more economical in its structure and operation than the devices which have been used heretofore.

It is a more particular object of my invention to provide a pressure break in which a single vertically extending pipe carries the high pressure water supply to the water tank of the pressure break and also carries the low pressure water supply from the water tank. My device thus eliminates the vertical stand pipe which customarily leads from the high pressure supply to the top of the water tank.

It is another object of my invention to provide a pressure break which resists corrosion and contamination and which is easy to clean and maintain.

A further object of my invention is to provide a pressure break which permits visual inspection of the water level and of the operation of the device.

Another object of my invention is to provide a pressure break which can be installed at any convenient place in a horizontal water supply line, which requires only a single T fitting, which is self-supporting on the T fitting and which is extremely compact in size.

It is also an object of my invention to provide a pressure break which utilizes novel features of structure and operation not heretofore found in devices of this type.

It is accordingly among the objects of my invention to provide a device of the class described having all of the advantages and benefits of the construction set forth above. My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings,

FIG. 1 is a perspective view on a reduced scale of my pressure break in use;

FIG. 2 is an enlarged sectional view of the same in closed position taken on line 2—2 of FIG. 1;

FIG. 3 is a sectional view of the valve structure in open position;

FIG. 4 is a sectional view taken on line 4—4 of FIG. 2 of the valve structure in closed position;

FIG. 5 is a sectional view of upper part of the T fitting taken on line 5—5 of FIG. 2.

A preferred embodiment which has been selected to illustrate my invention comprises a T fitting 10, which is screw threadedly mounted in a break in a horizontal water supply line. One side of the T fitting 10 comprises a horizontally directed inlet portion 13 which is adapted to be connected to a suitable source of high pressure water supply by means of external screw threading. The other side of the T fitting 10 comprises a horizontally directed outlet portion 14 which is adapted to be connected to a line which supplies the poultry watering equipment by means of external screw threading. The upper part of the T fitting 10 comprises a vertical portion 15 having external screw threading at its upper end. An L-shaped water inlet passage 11 extends through the inlet portion 13 and vertical portion 15 of the T fitting 10. An L-shaped water outlet passage extends through the outlet portion 14 and vertical portion 15 of the T fitting 10. The diameter of the water inlet passage 11 is substantially smaller than that of the water outlet passage 12.

Mounted on the upper end of the vertical portion 15 is a substantially cylindrical water tank 18. The bottom of the tank 18 has a central circular opening through which the upper end of the vertical portion 15 of the T fitting 10 extends. A pair of lock nuts 16 are disposed adjacent to a pair of washers 17, which are in turn disposed on the inside and outside of the bottom of the water tank 18 surrounding the vertical portion 15. The water tank 18 is preferably formed of flexible, semi-transparent corrosion resistant material such as polyethylene plastic. The tank 18 is preferably of half gallon size and has a removable plastic lid 19. The lid 19 has a small ventilating opening 20.

The water inlet passage 11 is provided adjacent its upper end with internal screw threading for receiving and holding the vertically directed lower end 22 of an elongated water supply tube 21. The water supply tube 21 is bent to form a horizontal center portion 23 and a vertically directed upper end 24, which is disposed adjacent to the side of the water tank 18.

The top of the water supply tube 21 is screw threadedly connected to an outlet fitting 25. The outlet fitting 25 has a hollow interior portion which is connected to the lower end of an angularly directed tubular water outlet 26. The upper end of the water outlet 26 is open.

The top of the outlet fitting 25 is bifurcated to provide a pair of spaced arms 27 which form a yoke. A lever arm 28 carries at its outer end a ball float 29, which may be formed of lightweight water resistant plastic material or which may be hollow. The other end of the lever arm 28 is bent downwardly and is provided with a recess 39, in which there is mounted a resilient valve seat 30, which is disposed directly above the upper end of the water outlet 26.

A pivot pin 31 has a lower straight portion 32 which extends through aligned openings in the arms 27 and the end of the lever arm 28 to mount the lever arm 28 for pivotal movement between the arms 27. The pivot pin 31 has an upper bent portion 33 which extends across the top of the arms 27 to hold the pivot pin 31 in place.

In operation, water flows through the water inlet passage 11 into the water supply tube 31 and then into the outlet fitting 25 and water outlet 26. If the tank 18 is empty, the ball float 29 will be in downward position, pivoting the opposite end of the lever arm 28 to an upward position. This removes the valve seat 30 from the upper end of the water outlet 26 and permits water to flow into the tank 18.

As the tank 18 fills, the water moves the ball float 29 (which is lighter than water) upwardly until the valve seat 30 closes off the water outlet 26 to prevent further water from flowing into the tank 18.

As water is consumed by the poultry, it flows out of the water tank 18 through the water outlet passage 12. The pressure of the outgoing water is reduced to the small amount of pressure provided by the elevation of the water tank 18 above the poultry watering equipment. In use, a close balance is maintained whereby the water supply in the tank 18 is maintained at a substantially constant level, with the water being replaced at substantially the same rate at which it is consumed.

All of the parts of my device are preferably formed of water resistant material such as brass, stainless steel or plastic. It will be noted that the semi-transparency of the water tank 18 permits the poultryman to make a visual check of the operation of the device. A sealing material may be provided, if necessary, around the portion of the lower end 22 of the water supply tube 21 which extends into the water inlet passage 11.

I claim:

1. A pressure break for poultry watering equipment comprising a T fitting, said T fitting having a horizontally directed inlet portion adapted to be connected to a high pressure source of water supply, a horizontally directed outlet portion adapted to be connected to the watering equipment and a vertically directed portion, an L-shaped water inlet passage extending through said inlet portion and said vertical portion, an L-shaped water outlet passage extending through said outlet portion and said vertical portion, a substantially cylindrical water tank formed of semi-transparent polyethylene mounted on the upper end of the vertical portion of said T fitting, the bottom of said water tank having a central circular opening, said vertical portion extending through said opening, fastening means surrounding said opening on opposite sides of the bottom of said tank to secure said tank on said vertical portion, a water supply tube having a vertically directed lower end screw threadedly mounted in the upper end of said water inlet passage, said tube being bent to provide a vertically directed upper end disposed adjacent to the side of said water tank, an outlet fitting mounted on the upper end of said water supply tube, said fitting having an angularly directed tubular water outlet, said water outlet being connected to said water supply tube through said outlet fitting, the upper end of said outlet fitting being bifurcated to provide a pair of spaced arms defining a yoke, an elongated lever arm, a ball float carried by one end of said lever arm, the other end of said lever arm extending between said arms, a pivot pin having a straight portion extending through aligned openings in said lever arm and said arms, said pivot pin having a bent portion extending across the top of said arms, the end of said lever arm remote from said ball float being bent to extend across said water outlet, said end of said lever arm being cut away to provide a recess, a resilient valve seat mounted in said recess, said valve seat being adapted to close off said water outlet upon the upward movement of said ball float in response to the water level in said water tank.

2. A pressure break for poultry watering equipment comprising a T fitting, said T fitting having an inlet portion adapted to be connected to a high pressure source of water supply, an outlet portion adapted to be connected to the watering equipment and a vertically directed portion, an L-shaped water inlet passage extending through said inlet portion and said vertical portion, an L-shaped water outlet passage extending through said outlet portion and said vertical portion, a water tank mounted on the upper end of the vertical portion of said T fitting, a water supply tube having its lower end screw threadedly mounted in the upper end of said water inlet passage, said tube having a vertically directed upper end disposed adjacent to the side of said water tank, an outlet fitting mounted on the upper end of said water supply tube, said fitting having a water outlet connected to said water supply tube through said outlet fitting, the upper end of said water outlet being open, said outlet fitting having a pair of spaced arms, an elongated lever arm, a ball float carried by one end of said lever arm, the other end of said lever arm extending between and being pivotally mounted on said arms, the end of said lever arm remote from said ball float extending across the open end of said water outlet, said end of said lever arm being cut away to provide a recess, a resilient valve seat mounted in said recess, said valve seat being adapted to close off the open end of said water outlet upon the upward movement of said ball float in response to the water level in said water tank.

3. A pressure break for poultry watering equipment comprising a fitting, said fitting having an inlet portion adapted to be connected to a high pressure source of water supply, an outlet portion adapted to be connected to the watering equipment and a vertically directed portion, a water inlet passage extending through said inlet portion and said vertical portion, a water outlet passage extending through said outlet portion and said vertical portion, a water tank mounted on the upper end of said vertical portion, a water supply tube having its lower end connected to the upper end of said water inlet passage, an outlet fitting mounted on the upper end of said water supply tube, said fitting having a water outlet connected to said water supply tube, the upper end of said water outlet being open, an elongated lever arm, a ball float carried by one end of said lever arm, said lever arm being pivotally mounted on said outlet fitting, the end of said lever arm remote from said ball float being adapted to close off the open end of said water outlet upon the upward movement of said ball float in response to the water level in said water tank.

4. A pressure break for poultry watering equipment comprising a T fitting, said T fitting having a horizontally directed inlet portion adapted to be connected to a high pressure source of water supply, a horizontally directed outlet portion adapted to be connected to the watering equipment and a vertically directed portion, an L-shaped water inlet passage extending through said inlet portion and said vertical portion, an L-shaped water outlet passage extending through said outlet portion and said vertical portion, a water tank mounted on the upper end of the vertical portion of said T fittings, the bottom of said water tank having a central circular opening, said vertical portion extending through said opening, a water supply tube connected to said water inlet passage, said tube having a vertically directed upper end disposed adjacent to the side of said water tank, an outlet fitting mounted on the upper end of said water supply tube, said fitting having a water outlet, said water outlet being connected to said water supply tube through said outlet fitting, the upper end of said water outlet being open, an elongated lever arm, a float carried by one end of said lever arm, a pivot pin extending through said lever arm and said outlet fitting to pivotally mount said lever arm on the upper end of said outlet fitting, said pivot pin having a resilient portion to hold said pin on said outlet fitting, the end of said lever arm remote from said float extending across the open end of said water outlet and carrying a resilient valve seat, said valve seat being adapted to close off the open end of said water outlet upon the upward movement of said float in response to the water level in said water tank.

5. A pressure break for poultry watering equipment comprising a T fitting, said T fitting having a horizontally directed inlet portion adapted to be connected to a high pressure source of water supply, a horizontally directed outlet portion adapted to be connected to the watering equipment and a vertically directed portion, an L-shaped water inlet passage extending through said inlet portion and said vertical portion, an L-shaped water outlet passage extending through said outlet portion and said vertical portion, a water tank mounted on the upper end of the vertical portion of said T fitting, the bottom of said water tank having an opening, said vertical portion extending through said opening, a water outlet within said tank connected to said water inlet passage, an elongated lever arm, a float carried by said lever arm, said lever arm being pivotally mounted adjacent said water outlet, the end of said lever arm remote from said float being adapted to close off said water outlet upon the upward movement of said float in response to the water level in said water tank.

References Cited in the file of this patent

UNITED STATES PATENTS

| | | |
|---|---|---|
| 976,874 | Hasman | Nov. 29, 1910 |
| 990,337 | Charroin | Apr. 25, 1911 |
| 1,259,415 | Kuebler | Mar. 12, 1918 |
| 2,172,647 | Widman | Sept. 12, 1939 |
| 2,720,215 | Stott | Oct. 11, 1955 |
| 2,795,237 | Corbin | June 11, 1957 |
| 2,824,571 | Skerritt | Feb. 25, 1958 |

FOREIGN PATENTS

| | | |
|---|---|---|
| 25,835 | Great Britain | Dec. 7, 1898 |